Figure 1:
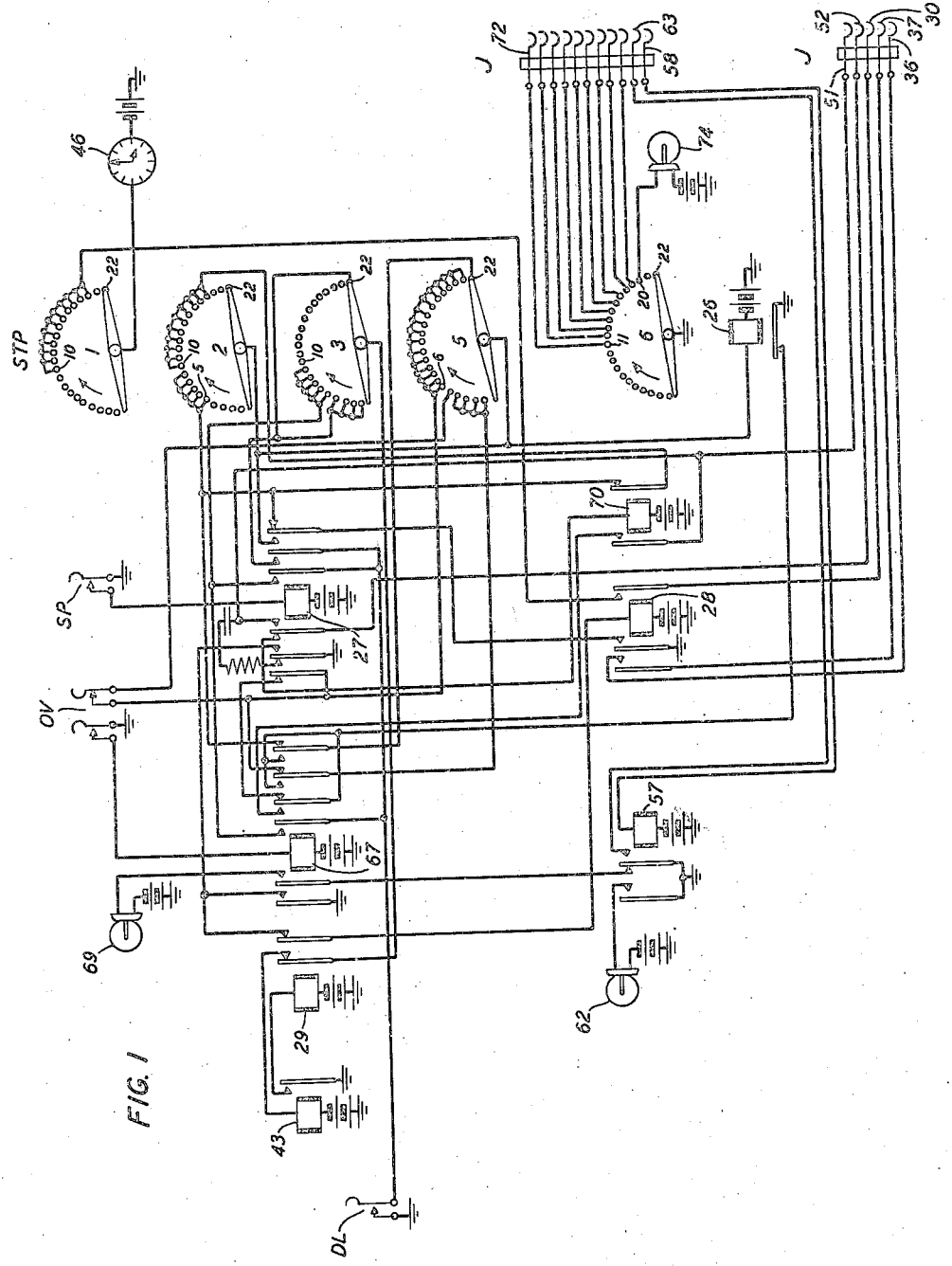

Aug. 16, 1949.  W. R. LUTHER  2,479,073
TESTING SYSTEM FOR SELECTOR SWITCHES
Filed Aug. 30, 1946  2 Sheets-Sheet 1

INVENTOR
W. R. LUTHER
BY
A. F. Kane
ATTORNEY

Aug. 16, 1949.    W. R. LUTHER    2,479,073
TESTING SYSTEM FOR SELECTOR SWITCHES
Filed Aug. 30, 1946    2 Sheets-Sheet 2

INVENTOR
W. R. LUTHER
BY
ATTORNEY

Patented Aug. 16, 1949

2,479,073

UNITED STATES PATENT OFFICE 2,479,073

TESTING SYSTEM FOR SELECTOR SWITCHES

Walter R. Luther, Hempstead, N. Y., assignor to Bell Telephone Laboratories, Incorporated, New York, N. Y., a corporation of New York Application August 30, 1946, Serial No. 694,113

7 Claims. (Cl. 179—175.21)

This invention relates to testing systems and particularly to means for testing the operation of selector switches of the type extensively employed in automatic telephone systems, and for detecting abnormalities in the operation thereof.

In automatic telephone systems the selector switch plays an important role, and the high standard of speedy, accurate and dependable service attained by the operating companies in providing the public with communication facilities of the automatic type depends, in a large measure, on the fact that the automatic switches employed in such systems must meet stringent requirements as to speed of operation and performance before they are placed in service.

The selector switch employed in automatic telephone systems is, as is well known, a two motion switch, that is, its wiper is moved vertically to associate itself with a particular level of switch terminals and then is moved in a rotary manner to hunt for and seize a particular group of terminals in the level to which it has been raised. In order that such a switch be acceptable for use it must be capable of performing its rotary movement, or hunting operation, within a predetermined time limit, and it must also perform its hunting operation in a manner which precludes the possibility of false connections. More particularly, the switch in its hunting operation must function in such a manner that it does not overstep or understep. The hunting operation of a selector switch is controlled by the operation of the rotary magnet. By "overstepping" is meant taking more than one step on a single operation of the rotary magnet. Similarly, by "understepping" is meant taking fewer steps than is intended by the rotary magnet.

It is the object of this invention to provide means for testing selector switches of the type employed extensively in automatic telephone systems and thereby to detect and indicate any maladjustment thereof which may result in overstepping or understepping during the rotary movement thereof or which may cause the switch to take longer than a predetermined time to perform its hunting operation.

This object is attained by means of a simple test circuit, involving an automatic stepping switch, which may be associated with a selector switch to be tested, and controlled in such a manner that a visual indication is obtained should the switch under test overstep or understep during a hunting operation thereof, and in which provision is made to "clock" the switch during its hunting operation.

The test circuit of this invention consists essentially of (1) two switching relays, a speed test relay and an overstep relay, each operated by a manually operated key; (2) a third key which controls the operation of a pair of interrupter relays whose function is to provide pulses for vertically stepping the selector under test; (3) a general utility relay whose main function is to insure closure of the clock circuit at practically the instant the loop to the selector pulse-receiving relay is closed after vertical pulsing; (4) an auxiliary relay which closes the selector rotary magnet circuit, on overstep test, as soon as the test circuit has advanced; (5) a cut-through relay which operates on cut-through of the selector when its tenth rotary step is completed to light a lamp signal. On overstep, its failure to operate provides a visual indication to identify an overstep; and (6) an automatic rotary stepping switch, of well-known design, which counts the vertical pulses generated by the interrupter relays, partially closing the clock circuit when the desired selector level is reached. On overstep test this switch counts the operations of the selector, at each step marking the bank sleeve terminal on which the selector wiper is resting so as to permit the selector to advance to the next group of terminals.

The invention will be better understood from the following detailed description when read in connection with the accompanying drawings, in which:

Fig. 1 is a circuit diagram of the test circuit of this invention; and

Figure 2:
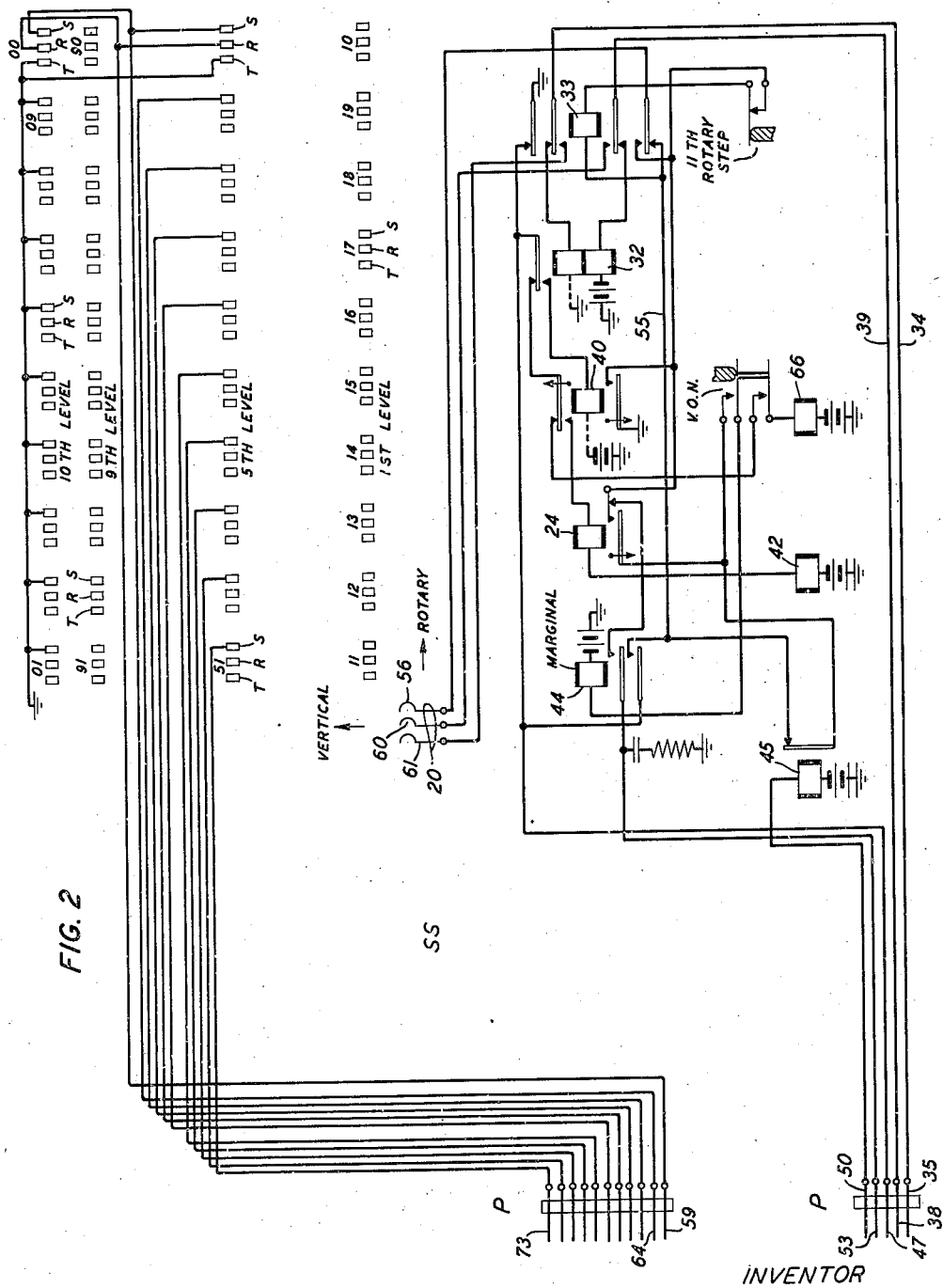

Fig. 2 is a circuit diagram of a step-by-step selector switch of well-known type which is to be tested for hunting speed and overstep by means of the test circuit of Fig. 1. Only those elements of the selector switch to be tested, which are essential to a complete understanding of the invention are disclosed. In the upper right portion of Fig. 2 there are schematically illustrated four of ten vertical levels of the selector, each level including ten groups of tip, ring and sleeve terminals. The first level of the switch includes terminal groups 11, 12, 13, 14, 15, 16, 17, 18, 19 and 10. Corresponding groups on the remaining levels are also illustrated. The selector switch brushes, or wiper, are shown at 20.

Rotay hunting speed test

This test is made on the tenth selector bank level in order to provide ten impulses of current to relay 24 in the selector (Fig. 2), insuring its slowest release time since this time is a part of the hunting period to be measured.

The brushes of the rotary type selector switch STP (Fig. 1), normally rest in position No. 22, the switch, as illustrated being a twenty-two point five-arc switch of well-known design. In this type of switch the brushes advance on release of the stepping magnet. In making the rotary hunting speed test the key SP is operated first and is followed by the operation of key DL. These key operations are performed after the plugs P, which have been associated with the selector SS are inserted in the jacks J which terminate the test circuit. When key SP is operated an obvious energizing circuit for relay 27 is completed in which circuit relay 27 operates. Relay 28 now operates in a circuit extending from grounded battery, winding of relay 28, outer armature and back contact of relay 29, front contact and middle left armature of relay 27, to ground.

Relay 28 at its inner left armature and front contact completes an operating circuit for the stepping magnet 26 of switch STP which extends from ground at said front contact, over the outermost right armature and front contact of relay 27, winding of magnet 26 to battery and ground. Magnet 26 operates to prepare the switch STP for stepping. At its right armature and front contact relay 28 connects the tenth to the twentieth terminals of bank 1 of switch STP to the jack contact 30 for a purpose which will appear presently.

Relay 28 at its outer left armature and front contact completes the following circuit for pulse-receiving relay 32 of the selector switch SS: grounded battery, lower winding of relay 32, back contact and inner lower armature of relay 33, conductor 39, plug contact 38, jack contact 37, outer left armature and front contact of relay 28, jack contact 36, plug contact 35, conductor 34, inner upper armature and back contact of relay 33, upper winding of relay 32, to ground.

Selector relay 32 operates in the above-traced circuit and at its armature and front contact completes an obvious energizing circuit for relay 40 which relay, among other functions, prepares a circuit for the vertical stepping magnet 42 of switch SS.

When key DL in the test circuit (Fig. 1) is actuated, a circuit for interrupter relay 43 is completed which may be traced from grounded battery, winding of relay 43, back contact and inner armature of relay 29, the brush of terminal bank 3 of switch STP and the twenty-second terminal thereof, front contact and middle right armature of relay 27, to ground at the contacts of key DL. It will be observed that the twenty-second terminal of bank 3 of switch STP is connected to the terminals 1 to 9, inclusive, terminals 1 to 4 being directly connected to terminal 22 and terminals 5 to 9 being connected thereto by way of the front contacts and innermost and middle right armatures of relay 27. Hence, with key DL actuated and relay 27 operated, terminals 22 to 9 of bank 3 of the switch STP are grounded, ground potential being applied at the contacts of key DL.

Relay 43, operated, completes an obvious operating circuit for interrupter relay 29. When relay 29 operates it interrupts the operating circuit for relay 28 which, in turn, interrupts the operating circuits for stepping magnet 26 of switch STP and for pulse-receiving relay 32 of selector SS. Thus the brushes of switch STP are advanced one step for each interruption of the circuit to relay 28 and, as the brush of terminal bank 3 advances from the twenty-second terminal to the ninth terminal relays 43 and 29 are operated ten times causing ten interruptions of the circuit to relay 28. Since relay 28 controls both the stepping magnet 26 of switch STP and pulse-receiving relay 32 of selector SS, both switches operate simultaneously. The switches therefore are advanced ten positions, switch SS being stepped vertically ten steps in a manner now to be described.

The alternate release and operation of relay 28 causes selector relay 32 to respond in a corresponding manner. Thus a condition which simulates the dialing of zero is set up. The first release of relay 32 closes a circuit from ground at the outer upper armature and back contact of relay 33, armature and back contact of relay 32, upper armature and front contact of slow-to-release relay 40, winding of relay 24, winding of vertical magnet 42, to battery and ground. The relay 24 and magnet 42 operate, the operation of the magnet causing the shaft and brushes, or wiper 20 of switch SS to be stepped up to the first level of the switch. The reoperation of relay 32 at the end of the first impulse causes the release of magnet 42. Due to its slow release characteristics relay 24 remains operated until all of the impulses in the train of ten have been received, as does also relay 40. Each succeeding release and reoperation of relay 32 are effective to cause a corresponding operation of magnet 42, the brushes 20 being thereby stepped up to the tenth level.

When the shaft of switch SS is moved out of its normal position upon receipt of the first pulse, the vertical off-normal springs VON are actuated, and with relay 40 operated as above-described, a circuit is closed from battery through the winding of relay 44, upper contacts of springs VON, front contact and armature of relay 24, to ground at the front contact and lower armature of relay 40. Relay 44 operates and at its lower armature and front contact locks to ground at the back contact and outer upper armature of relay 33 by way of the armature and back contact of rotary magnet 45 and the upper contacts of the VON springs.

When the switch STP has advanced ten steps and the brush of terminal bank 3 reaches the tenth terminal, the circuit for relay 43 is opened and pulsing ceases and relay 28 remains operated. When the brush of terminal bank 1 reaches the tenth terminal a circuit is completed for the clock 46. This circuit may be traced from grounded battery, clock 46, brush of terminal bank 1 of switch STP, tenth terminal thereof, front contact and right armature of relay 28, jack contact 30, plug contact 47, to ground at the back contact and outer upper armature of selector relay 33. The switch STP remains in its tenth position during the hunting period of selector switch SS.

Relay 28 also recloses the circuit to relay 32 of the selector SS which proceeds to hunt in the usual way as will now be described. It will be observed that the circuit to the timing device 46 is completed at the instant the selector starts its hunting operation; that is, when the loop to relay 32 is closed after vertical pulsing has been completed. When relay 24 releases after all of the ten impulses have been received and relay 32 has reoperated, a circuit is closed from battery through the winding of rotary magnet 45, plug contact 50, jack contact 51, front contact and innermost left armature of relay 27, jack contact 52, plug contact 53, inner armature and front contact of relay 44, back contact of relay 24, to ground on the front contact and lower armature of relay 40. The operation of magnet 45 advances the brushes of switch SS into contact with the first set of terminals 01 in the tenth level and opens the circuit through the winding of relay 44. The release of relay 44 causes the release of magnet 45. The release of magnet 45 connects the winding of relay 44 through the upper contacts of the VON springs, back contact and armature of magnet 45, to conductor 55, thence through the lowermost back contact of relay 33 to selector sleeve brush 56 and also from conductor 55 through the winding of relay 33 and the closed contact of the eleventh "rotary step" springs to ground at the front contact and lower armature of relay 40.

It will be observed that all sleeve terminals in the tenth switch level are permanently grounded except the sleeve terminal of the tenth group 00. Therefore, when the brush 56 engages the sleeve contact of terminal group 01 relay 44 operates. Relay 44 is marginal and will operate only when ground potential is encountered by the sleeve brush 56 as is the condition in the present case. Relay 33 is short-circuited and does not operate at this time.

With relay 44 reoperated, the rotary magnet 45 reoperates thereby advancing the brushes 20 to the next set of terminals in the tenth level. As previously stated, the first nine groups of terminals in the tenth level of switch SS have their sleeve terminals grounded. The rotary magnet 45 therefore, will be repeatedly operated and released until the brushes 20 are advanced to the terminal group 00, the sleeve terminal of which is ungrounded. When the sleeve wiper leaves terminal 09 ground is removed. Relay 44 is placed in series with relay 33 and fails to reoperate, therefore the selector steps no further. The short circuit around relay 33 is removed and this relay operates.

The tip terminal of terminal group 00 of switch SS is permanently grounded with the sleeve terminals of all preceding terminal groups in the tenth level of the switch and the ring terminal of this group is connected to cut-through relay 57 in the test circuit so that relay 57 now operates in a circuit including grounded battery, winding of relay 57, jack terminal 58, plug terminal 59, ring terminal of terminal group 00 of switch SS, brush 60, front contact and inner lower armature of relay 33, conductor 39, plug terminal 38, jack terminal 37, outer left armature and front contact of relay 28, jack terminal 36, plug terminal 35, conductor 34, inner upper armature and front contact of relay 33, tip brush 61, to ground at the tip terminal of terminal group 00.

Relay 57, at its outer armature and front contact completes an obvious energizing circuit for lamp 62 which thereupon is lighted to indicate that the selector SS has properly completed its hunting. At its inner armature and front contact relay 57 connects ground to jack terminal 63, and thence to the sleeve terminal of terminal group 00 by way of plug terminal 64. This ground holds relay 33 operated in a circuit which includes the now grounded sleeve terminal 00, sleeve wiper 56, outer lower armature and front contact of relay 33, eleventh rotary step contact, winding of relay 33, conductor 55, back contact and armature of rotary magnet 45, upper contacts VON, winding of relay 44 to battery and ground. When relay 33 operated it releases relay 32 which, in turn, releases relay 40 which removes the ground which first operated relay 33. This locking ground is necessary in order to hold relay 33 operated because, if relay 33 is allowed to release it will release relay 57 allowing insufficient time for the "test OK" signal to be observed conveniently. When relay 33 operated, as described, it removed ground from the circuit to clock 46, the clock thereupon stopping functioning. The clock 46 therefore, records the lapse of time between the closure of the selector relay 32 after vertical pulsing is completed and the opening of the back contacts of selector relay 33 at the end of hunting. Thus the clock gives an accurate record of the time involved in the hunting operation of the selector switch SS.

*Restoring*

Terminal bank 5 of switch STP is arranged to restore the switch to normal when the keys SP and DL are restored. With the restoration of key SP relay 27 is released which, in turn, releases relay 28 which opens the loop to the selector switch relay 32 which restores the selector switch SS to normal. When relay 32 releases, relay 40 is deenergized and releases. With relays 32 and 40 released the release magnet 66 operates in an obvious circuit which includes the lower contacts of the VON springs. The operation of magnet 66 causes the switch SS to restore to normal in the usual manner. When the shaft and brushes reach normal position the circuit through the winding of magnet 66 is opened at the VON springs.

With relay 27 in its normal unoperated condition stepping magnet 26 operates in a circuit which includes grounded battery, winding of magnet 26, brush of terminal bank 5, the tenth to the twenty-first terminals thereof, outermost left armature and back contact of relay 27, back contact and second right armature of relay 67, back contact and armature of magnet 26 and ground. Magnet 26 is repeatedly operated in this circuit, by self-interruption, until the switch is restored to its twenty-second, or home position at which position the operating circuit for magnet 26 is opened and the switch remains at rest.

*Overstep test*

The overstep test is, by design, made on the fifth selector bank level. It is therefore necessary to send only five pulses instead of ten as in the speed test previously described. As a matter of convenience pulsing is started from the fifth terminal of switch STP rather than from the twenty-second terminal.

In making the overstep test the overstep key OV is first actuated and is followed by the actuation of the DL key. When key OV is actuated, relay 67 operates in an obvious circuit. With relay 67 operated a circuit is completed to the stepping magnet 26 of switch STP. This circuit includes grounded battery, winding of stepping magnet 26, brush of terminal bank 5 of switch STP, terminals 22 to 4 thereof, the third and fourth right armatures and front contacts of relay 67, back contact and armature of magnet 26 and ground. At its inner left armature and front contact relay 67 completes an obvious energizing circuit for the overstep lamp signal 69 which lamp thereupon is lighted. At its outer left armature and front contact relay 67 establishes an obvious operating circuit for relay 28.

Relay 28, at its outer left armature and front contact closes the loop circuit to the selector switch SS to cause the operation of relay 32 therein. At its inner left armature and front contact relay 28 prepares another operating circuit for the stepping magnet 26 which will be completed under control of the brush of the terminal bank 2 of switch STP when this switch reaches the fifth position.

When the stepping magnet 26 is first energized incident to the operation of relay 67 it operates, by self-interruption, five times under control of the brush of terminal bank 5 of the switch STP. It will be observed that during these first five steps of switch STP interrupter relay 43 does not operate since the operating circuit therefor during this interval is opened at the first and second right front contacts of relay 27. This is true even if the key DL is prematurely actuated. It follows therefore, that relay 28 which is controlled in its stepping function by relay 29, which in turn is controlled by relay 43, does not function to control the stepping of selector switch SS until the stepping switch STP has already taken five steps.

When the DL key is actuated a circuit is completed for interrupter relay 43 after the stepping switch STP has advanced to the fifth position which includes grounded battery, winding of relay 43, back contact and inner armature of relay 29, the brush of terminal bank 3 of switch STP, terminals 5 to 9 thereof, front contact and first right armature of relay 67, contacts of key DL and ground. Relay 43 operates in this circuit and completes an obvious operating circuit for relay 29. At its outer armature relay 29 opens the operating circuit for relay 28 which releases and opens the operating circuit for stepping magnet 26 which circuit includes grounded battery, winding of magnet 26, brush of terminal bank 2 of switch STP, terminals 5 to 9 thereof, back contact and outermost right armature of relay 27, front contact and inner left armature of relay 28. Thus magnet 26 functions to step the switch STP five steps, to position 10, as relay 28 follows the interruptions produced by relays 43 and 29, which, as hereinbefore indicated are controlled by terminals 5 to 9 of terminal bank 3. After the switch STP leaves terminal 9 relays 29 and 43 release and relay 28 operates. In position 10 of the switch, magnet 26 operates through terminal 10 of bank 2 in preparation for stepping when it next releases.

Similarly, because of the interrupting action of relay 28, the loop to the selector switch SS is opened and closed five times causing corresponding operations of the selector relay 32. This relay functions, in the manner previously described, to cause the selector SS to take five vertical steps. The switch SS prepares to hunt in the usual manner.

When relay 32 in the selector SS first releases, vertical magnet 42 operates in a circuit which may be traced from grounded battery, winding of magnet 42, winding of relay 24, front contact and upper armature of relay 40, back contact and armature of relay 32, back contact and outer upper armature of relay 33 to ground. Relay 24 and magnet 42 operate in this circuit, the operation of the magnet causing the shaft and brushes 20 of switch SS to be stepped up to the first level of the switch. The reoperation of relay 32 at the end of the first impulse causes the release of magnet 42. Relay 24 being slow to release, remains operated until all of the impulses of the train of five have been received as does also relay 40. Relay 24 is slow enough in releasing to keep relay 44 locked up until the test circuit functions to ground the sleeve terminal of terminal group 51 as described hereinafter. This ground then replaces that through the front contact of relay 24. Each succeeding release and reoperation of relay 32 is effective to cause a corresponding operation of magnet 42, the brushes 20 being thereby stepped up to the fifth level.

When the shaft of switch SS is moved out of its normal position upon receipt of the first pulse, the vertical off-normal springs VON are operated and, with relay 40 operated as above-described, a circuit is closed from battery through the winding of relay 44, upper contacts of springs VON, front contact of relay 24, to ground at the front contact and lower armature of relay 40. Relay 44 operates and at its lower armature and front contact locks to ground at the back contact and outer upper armature of relay 33 by way of the armature and back contact of rotary magnet 45 and the upper contacts of the VON springs.

With relay 24 operated the circuit to relay 70 in the test circuit is opened and does not close until all five pulses have been received and relay 24 releases, the latter occurring on the reoperation of relay 32. With relay 24 released, relay 70 operates in a circuit extending from grounded battery, through the winding of relay 70, back contact and innermost left armature of relay 27, jack spring 52, plug spring 53, inner armature and front contact of relay 44, normal contacts of relay 24, to ground at the front lower contact of relay 40.

It will be observed, at this point, that the selector rotary magnet 45 is not operated as is the usual occurrence. Relay 70, operated, opens, at its right armature and back contact the circuit to stepping magnet 26 of switch STP, this circuit including terminals 10 to 19 of the terminal bank 2. At its left armature and front contact relay 70 connects the back contact of the stepping magnet 26 to the winding of rotary magnet 45 by way of the second right armature and front contact of relay 67, jack spring 51, and plug spring 50.

When the circuit to stepping magnet 26 is opened the magnet releases and switch STP is advanced to position 11. Magnet 26 closes its back contact, closing in part a path to rotary magnet 45 of switch SS. Magnet 45, however, does not operate until relay 24 has released. The rotary magnet 45 upon release of relay 24 functions to advance the brushes 20 to the bank terminals 51.

It will be observed that with the stepping switch STP in position 11 ground potential by way of the brush and the eleventh terminal of arc 6 is connected to the sleeve terminal of the terminal group 51 by way of jack spring 72 and plug spring 73. It will be further observed that when rotary magnet 45 operated it opened the operating circuit for relay 44 so that relay 44 releases and, in turn, releases relay 70. When relay 70 releases the circuit to rotary magnet 45 is opened and the rotary magnet releases.

With ground potential on the sleeve terminal of terminal group 51, relay 44 reoperates as soon as the rotary magnet has closed its back contact, beginning the second selector rotary step. Relay 44 again operates relay 70 and the cycle is repeated, each selector bank sleeve terminal being grounded through the brush and terminals of arc 6 of the switch STP as soon as the switch STP has advanced one step in response to an operation of the selector relay 44.

At the completion of hunting relay 33 of the selector SS and relay 57 of the test circuit operate and lock as in the speed test previously described. Upon operation of relay 57 the lamp 69 is extinguished and lamp 62 is lighted. Lamp 74 is also lighted by way of the brush and the twentieth terminal of arc 6 of switch STP.

Any failure of the selector SS and of the test circuit to keep in step results in failure of both to advance and the consequent failure of relay 57 to operate. Therefore, lamp 69, which is preferably colored red, which lighted when relay 67 operated, remains lighted to signal an overstep and the lamp 62, which may be white, does not light.

The circuit to clock 46 is controlled in the same manner as for the speed test, but its reading now is not a measure of the selector hunting time. This is because hunting has been delayed by awaiting test circuit action on each step.

When the keys OV and DL are restored the switch STP is advanced to position 22. Relay 28 restores, opening the loop to selector relay 32 which restores the selector circuit.

While the last description has been concerned particularly with overstepping it is to be understood that understepping as well as overstepping will be indicated on the "overstep" test.

What is claimed is:

1. In combination, a selector switch having a wiper adapted to be moved vertically to a predetermined level of terminal sets and thereafter rotatively to hunt in the predetermined level for a particular terminal set, a normally disabled timing device, a stepping switch, manually operable means for initiating the operation of said stepping switch, means controlled by said stepping switch for vertically moving said selector switch wiper to a predetermined level of terminal sets, means effective when said selector switch wiper reaches the predetermined level for initiating the hunting operation of said switch wiper and for simultaneously enabling said timing device, and means responsive to the arrival of said switch wiper at the said particular terminal set in the predetermined level for disabling said timing device, whereby the time consumed by said selector switch during the hunting operation is indicated by said timing device.

2. In combination, a selector switch having a plurality of levels of terminal sets, each set including tip, ring and sleeve terminals, the sleeve terminals of all but one of said sets being permanently marked busy, and a switch wiper adapted to move vertically to a selected switch level and thereafter to hunt in the selected switch level for the sleeve terminal of an unmarked set of terminals, a normally disabled timing device, a stepping switch, manually operable means for initiating the operation of said stepping switch, means controlled by said stepping switch for moving said selector switch wiper vertically to a predetermined level of terminal sets, means effective when said selector switch wiper reaches the predetermined level for initiating the hunting operation of said switch wiper and for simultaneously enabling said timing device, whereby said switch wiper advances successively over the terminal sets marked busy until an unmarked set is reached, a signal device, and means responsive to the arrival of said switch wiper at the unmarked terminal set for operating said signal device and for disabling said timing device, whereby said signal device indicates the end of the hunting operation and said timing device records the time consumed thereby.

3. In combination, a selector switch comprising a plurality of contact levels, each level including a plurality of groups of terminals, a wiper adapted to be selectively raised vertically to any of the contact levels and subsequently to be caused to hunt in the selected level for an ungrounded terminal in the groups of terminals contained in the selected level, and means for timing the hunting operation of said selector comprising manually operable keys, an automatic stepping switch and a normally disabled timing device, means including said stepping switch responsive to the actuation of said keys for stepping the wiper of said selector vertically to a predetermined switch level, means effective upon the arrival of said wiper at the said predetermined switch level for initiating the hunting operation of said first switch and for simultaneously enabling said timing device, and means responsive to the engagement of the wiper of said switch with an ungrounded terminal in the said predetermined level for disabling said timing device whereby said timing device records the time consumed by said selector switch in the hunting operation thereof.

4. In a system for testing a selector switch adapted to hunt, step by step, over successive busy sets of terminals of a predetermined group of terminal sets and stop on the first idle set of terminals encountered, means for detecting and indicating overstepping of said selector during its hunting operation comprising an automatic step-by-step switch, means associating said automatic switch with a selector switch to be tested, means including said automatic switch for conditioning said selector switch to hunt in a predetermined group of terminal sets, means effective, upon the conditioning of said selector switch to hunt, for simultaneously stepping said automatic switch and said selector switch, whereby said switches step in unison and the selector switch hunts in the predetermined group of terminal sets, a signal device, and means effective when said selector switch has reached an idle set of terminals and said automatic switch has advanced a corresponding number of steps for operating said signal device.

5. In a system for testing a selector switch of the type employed in automatic telephone systems and which has a wiper adapted to be selectively raised vertically to any of a plurality of switch levels and to thereafter be rotated to hunt for an idle set of terminals in the selected switch level, means for detecting and indicating overstepping of the selector switch wiper during the hunting operation thereof comprising an automatic step-by-step switch, means associating said automatic switch with a selector switch to be tested, said automatic switch having a predetermined terminal position corresponding to an idle set of terminals in a predetermined level of said selector switch, a signal device, means including said automatic switch for conditioning said selector switch to hunt in the said predetermined level thereof, means for thereafter stepping said switches in unison whereupon said selector switch wiper is moved, step by step, over the terminal sets of the said predetermined switch level and comes to rest on the idle terminal set thereof and said automatic switch is stepped to the said corresponding predetermined terminal position, and relay means operated by way of terminals of the idle terminal set engaged by the wiper of said selector switch for effecting the actuation of said signal device.

6. In a system for testing a selector switch adapted to hunt, step by step, over successive busy sets of terminals of a predetermined group of terminal sets and stop on the first idle set of terminals encountered, means for detecting and indicating overstepping of said selector during its hunting operation comprising an automatic step-by-step switch, means associating said automatic switch with a selector switch to be tested, means including said automatic switch for conditioning said selector switch to hunt in a predetermined group of terminal sets, means effective upon the conditioning of said selector switch to hunt, for causing said selector switch to engage the first set of terminals in the predetermined group, means for simultaneously marking the first set of terminals busy, means effective upon the engagement of said selector switch with the marked first set of terminals for advancing said selector switch to the next set of terminals and for simultaneously marking said next set of terminals busy, whereby the terminal sets in said predetermined group are successively marked busy and said selector switch hunts over said terminal sets successively, means controlled by said selector switch for advancing said automatic stepping switch in unison with said selector switch whereby said stepping switch takes steps corresponding in number to the number of terminal sets engaged by said selector switch, a signal device, and means controlled by said stepping switch for operating said signal device when said selector switch engages an unmarked set of terminals and said stepping switch has advanced a number of steps corresponding to the number of terminal sets engaged by said selector switch in reaching the said unmarked terminal set.

7. In a system for indicating the time consumed by a selector switch during a hunting operation performed in a predetermined switch level therein, the sleeve terminal of all but one of the terminal groups in the predetermined level being marked busy, a test circuit associated with said selector switch a normally disabled timing device in said test circuit, manually operable switches in said test circuit, means in said test circuit responsive to the operation of said manually operable switches for causing said selector switch to be stepped to the said predetermined level, means in said test circuit effective when said selector switch reaches the said predetermined level for enabling said timing device and for simultaneously initiating the hunting operation of said selector switch, means including the busied sleeve terminals of the terminal groups in the predetermined switch level for causing the selector to hunt therein until the unbusied sleeve terminal is reached, and means responsive to the arrival of the selector at the unbusied sleeve terminal for disabling said timing device.

WALTER R. LUTHER.

REFERENCES CITED

The following references are of record in the file of this patent:

UNITED STATES PATENTS

| Number | Name | Date |
|---|---|---|
| 1,575,312 | Bertels | Mar. 2, 1926 |
| 1,617,405 | MacDougall | Feb. 15, 1927 |
| 1,648,053 | Martin | Nov. 8, 1927 |
| 1,650,721 | Peoples | Nov. 29, 1927 |
| 1,745,037 | Ostline | Jan. 28, 1930 |
| 1,816,570 | Draper | July 28, 1931 |
| 1,854,456 | Deakin | Apr. 19, 1932 |
| 1,888,964 | Pearce | Nov. 22, 1932 |
| 1,923,662 | Caswell | Aug. 22, 1933 |
| 1,926,894 | Dehn | Sept. 12, 1933 |
| 2,144,866 | Allen | Jan. 24, 1939 |
| 2,238,126 | Myers | Apr. 15, 1941 |
| 2,293,588 | Cain et al. | Aug. 18, 1942 |